(12) United States Patent
Murayama et al.

(10) Patent No.: US 11,229,866 B2
(45) Date of Patent: Jan. 25, 2022

(54) AIR FILTER, LIGHT SOURCE DEVICE, AND AIR FILTER MANUFACTURING METHOD

(71) Applicant: HAMAMATSU PHOTONICS K.K., Hamamatsu (JP)

(72) Inventors: Kyoichi Murayama, Hamamatsu (JP); Ryotaro Matui, Hamamatsu (JP); Yasumasa Hakamata, Hamamatsu (JP); Koji Maejima, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 259 days.

(21) Appl. No.: 16/430,786

(22) Filed: Jun. 4, 2019

(65) Prior Publication Data
US 2019/0366253 A1 Dec. 5, 2019

(30) Foreign Application Priority Data
Jun. 5, 2018 (JP) .............................. JP2018-107901

(51) Int. Cl.
*B01D 46/00* (2006.01)
*B01D 46/42* (2006.01)
*B01D 39/14* (2006.01)
*B01D 39/16* (2006.01)

(52) U.S. Cl.
CPC ......... *B01D 46/0002* (2013.01); *B01D 39/14* (2013.01); *B01D 46/42* (2013.01); *B01D 2239/10* (2013.01)

(58) Field of Classification Search
CPC .... B01D 46/0002; B01D 46/42; B01D 39/14; B01D 39/1676; B01D 2239/10; B01D 2239/1208; B01D 2275/403

USPC ............ 55/385.1, 486, 527, DIG. 5, DIG. 31
See application file for complete search history.

(56) References Cited

U.S. PATENT DOCUMENTS

| | | | | |
|---|---|---|---|---|
| 4,152,183 | A * | 5/1979 | Honacker | B03C 3/49 156/78 |
| 8,404,032 | B2 * | 3/2013 | Endo | B32B 7/12 96/154 |
| 9,011,567 | B2 * | 4/2015 | Sakamoto | D04H 1/4382 55/500 |
| 2003/0140794 | A1 * | 7/2003 | Wang | B01D 39/1676 96/226 |
| 2003/0141240 | A1 * | 7/2003 | Shiraishi | B01D 46/10 210/350 |
| 2007/0175192 | A1 * | 8/2007 | Niakan | B01D 46/521 55/486 |

(Continued)

FOREIGN PATENT DOCUMENTS

| | | |
|---|---|---|
| GB | 894732 A | 4/1962 |
| JP | S61-37213 U | 3/1986 |

(Continued)

*Primary Examiner* — Minh Chau T Pham
(74) *Attorney, Agent, or Firm* — Faegre Drinker Biddle & Reath LLP

(57) ABSTRACT

An air filter includes a first urethane portion made of polyurethane foam and having air permeability and a second urethane portion made of polyurethane foam and disposed so as to overlap with a part of the first urethane portion. The second urethane portion is higher in density than the first urethane portion. The first urethane portion and the second urethane portion are integrated with each other in a state where the second urethane portion is incorporated in the part of the first urethane portion.

14 Claims, 11 Drawing Sheets

(56) References Cited

U.S. PATENT DOCUMENTS

| | | | | |
|---|---|---|---|---|
| 2008/0072868 A1* | 3/2008 | Sasaki | ............... | F02M 35/024 |
| | | | | 123/198 E |
| 2009/0117366 A1* | 5/2009 | Honma | ............... | B32B 27/065 |
| | | | | 428/314.8 |
| 2010/0011532 A1* | 1/2010 | Norton | ............... | B01D 46/4227 |
| | | | | 15/347 |
| 2015/0089910 A1* | 4/2015 | Sasaki | ............... | F02M 35/024 |
| | | | | 55/487 |
| 2018/0133632 A1* | 5/2018 | Tripp | ............... | B01D 39/1623 |
| 2020/0155991 A1* | 5/2020 | Goris | ............... | B01D 46/0031 |

FOREIGN PATENT DOCUMENTS

| | | |
|---|---|---|
| JP | S62-126212 U | 8/1987 |
| JP | S62-1762512 A | 8/1987 |
| JP | 2001-000816 A | 1/2001 |
| JP | 2002-174855 A | 6/2002 |
| JP | 2005-336697 A | 12/2005 |
| JP | 2012-11326 A | 1/2012 |

\* cited by examiner

AIR FILTER, LIGHT SOURCE DEVICE, AND AIR FILTER MANUFACTURING METHOD

TECHNICAL FIELD

An aspect of the present disclosure relates to an air filter, a light source device, and an air filter manufacturing method.

BACKGROUND

Japanese Unexamined Patent Publication No. 2002-174855 discloses a projector device including a housing provided with an air intake port and a dustproof air filter attached to the housing so as to cover the air intake port. The air filter is configured as a filter unit having a filter member and a frame member holding the filter member and is fixed to the housing in the frame member.

SUMMARY

A device to which the air filter is applied may need to be reduced in size and the air filter may need to be reduced in thickness. However, simple air filter thickness reduction may lead to an increase in the complexity of air filter attachment to the housing. In addition, a separate frame member is necessary for the air filter to be sandwiched and fixed between the housing and the frame member, and then no sufficient device size reduction may be possible.

An object of an aspect of the present disclosure is to provide an air filter that can be reduced in thickness with attachability ensured, a light source device that can be reduced in size, and an air filter manufacturing method for such an air filter.

An air filter according to an aspect of the present disclosure includes a first urethane portion made of polyurethane foam and having air permeability and a second urethane portion made of polyurethane foam and disposed so as to overlap with a part of the first urethane portion. The second urethane portion is higher in density than the first urethane portion. The first urethane portion and the second urethane portion are integrated with each other in a state where the second urethane portion is incorporated in the part of the first urethane portion.

In this air filter, the air-permeable first urethane portion made of polyurethane foam and the second urethane portion made of polyurethane foam are integrated with each other in a state where the second urethane portion is incorporated in the part of the first urethane portion. As a result, it is possible to omit a frame member as described above and it is possible to reduce the thickness of the air filter. In addition, because the density of the second urethane portion is higher than the density of the first urethane portion, rigidity can be ensured for the air filter even after the air filter is reduced in thickness and handling of the air filter can be facilitated. Further, the air filter can be easily fixed to an attachment target (such as a housing) in the high-density second urethane portion even after the air filter is reduced in thickness. Accordingly, the air filter can be reduced in thickness with attachability ensured.

A recess may be provided in a surface of the first urethane portion and the second urethane portion may be disposed in the recess such that a surface of the second urethane portion is flush with the surface of the first urethane portion. In this case, the thickness of the air filter can be further reduced.

The air filter according to an aspect of the present disclosure may further include a metallic mesh member disposed between the first urethane portion and the second urethane portion. In this case, the rigidity of the air filter can be enhanced and the attachability of the air filter can be ensured in a more reliable manner.

The second urethane portion may be formed in a frame shape and disposed along an outer edge of the first urethane portion. In this case, the attachability of the air filter can be ensured in an even more reliable manner.

A through hole may be provided so as to penetrate the first urethane portion and the second urethane portion. In this case, it is possible to attach the air filter to an attachment target by, for example, inserting a screw into the through hole and it is possible to ensure the attachability of the air filter in an even more reliable manner.

An adhesive layer may be provided on a surface of the second urethane portion. In this case, the air filter can be attached to an attachment target by, for example, the adhesive layer and the attachability of the air filter can be ensured in an even more reliable manner.

An opening penetrating the first urethane portion may be provided at a remaining part of the first urethane portion other than the part. In this case, the air filter can be attached to an attachment target such that a protruding portion is disposed in the opening in a case where, for example, the protruding portion (such as a terminal portion) is provided at the air filter attachment position in the attachment target and the attachability of the air filter can be ensured in an even more reliable manner.

A light source device according to an aspect of the present disclosure includes the air filter and a housing provided with an intake port and accommodating a light source. The air filter is disposed so as to cover the intake port and fixed to the housing in the second urethane portion. This light source device includes the air filter, which can be reduced in thickness with attachability ensured as described above, and thus the light source device can be reduced in size.

An air filter manufacturing method according to an aspect of the present disclosure includes an overlapping step of overlapping a first urethane member made of polyurethane foam and having air permeability and a second urethane member made of polyurethane foam and higher in density than the first urethane member with each other such that the second urethane member overlaps a part of the first urethane member and an integration step of integrating the first urethane member and the second urethane member with each other by thermocompression bonding after the overlapping step.

In this air filter manufacturing method, the air-permeable first urethane member made of polyurethane foam and the second urethane member made of polyurethane foam are overlapped with each other and integrated with each other by thermocompression bonding. As a result, it is possible to omit the above-mentioned frame member and it is possible to obtain the thickness-reduced air filter. In the obtained air filter, the part that the second urethane member constitutes is higher in density than the part that the first urethane member constitutes. Accordingly, rigidity can be ensured for the air filter even after the air filter is reduced in thickness and handling of the air filter can be facilitated. Further, even in a case where the air filter is reduced in thickness, it is possible to easily fix the air filter to an attachment target (such as a housing) at the part that the second urethane member constitutes. As described above, the air filter that can be reduced in thickness with attachability ensured can be obtained by the air filter manufacturing method.

In the integration step, the first urethane member and the second urethane member may be integrated with each other by thermocompression bonding in a state where the first urethane member and the second urethane member are directly overlapped with each other. In this case, the thickness of the air filter can be further reduced.

In the overlapping step, the first urethane member, the second urethane member, and a metallic mesh member may be mutually overlapped such that the mesh member is disposed between the first urethane member and the second urethane member. In the integration step, the first urethane member and the second urethane member may be integrated with each other by thermocompression bonding in a state where the mesh member is disposed between the first urethane member and the second urethane member. In this case, the rigidity of the air filter can be enhanced and the attachability of the air filter can be ensured in a more reliable manner.

The air filter manufacturing method according to an aspect of the present disclosure may further include a step of forming a through hole after the integration step, the through hole penetrating the first urethane member and the second urethane member. In this case, it is possible to attach the air filter to an attachment target by, for example, inserting a screw into the through hole and it is possible to ensure the attachability of the air filter in an even more reliable manner.

The air filter manufacturing method according to an aspect of the present disclosure may further include a step of forming an adhesive layer on a surface of the second urethane member after the integration step. In this case, the air filter can be attached to an attachment target by, for example, the adhesive layer and the attachability of the air filter can be ensured in an even more reliable manner.

The air filter manufacturing method according to an aspect of the present disclosure may further include a step of forming an opening at a remaining part of the first urethane member other than the part after the integration step, the opening penetrating the first urethane member. In this case, the air filter can be attached to an attachment target such that a protruding portion is disposed in the opening in a case where, for example, the protruding portion (such as a terminal portion) is provided at the air filter attachment position in the attachment target and the attachability of the air filter can be ensured in an even more reliable manner.

According to an aspect of the present disclosure, it is possible to provide an air filter that can be reduced in thickness with attachability ensured, a light source device that can be reduced in size, and an air filter manufacturing method.

DETAILED DESCRIPTION

Figure 1:
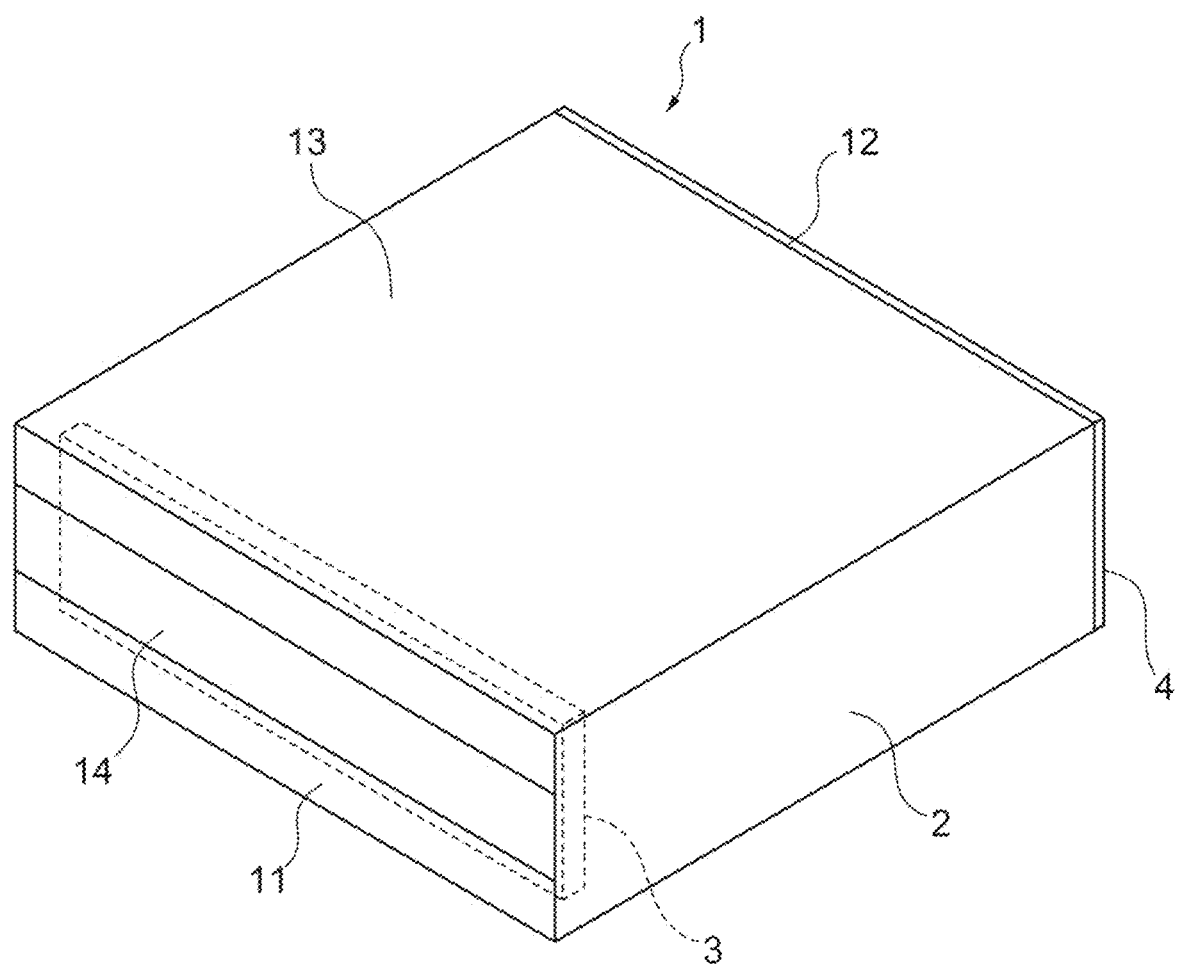
FIG. 1 is a perspective view in which a light source device provided with an air filter according to an embodiment is viewed from the front side.

Hereinafter, an embodiment of the present disclosure will be described in detail with reference to accompanying drawings. In the following description, the same or corresponding elements will be denoted by the same reference numerals without redundant description.

Figure 2:
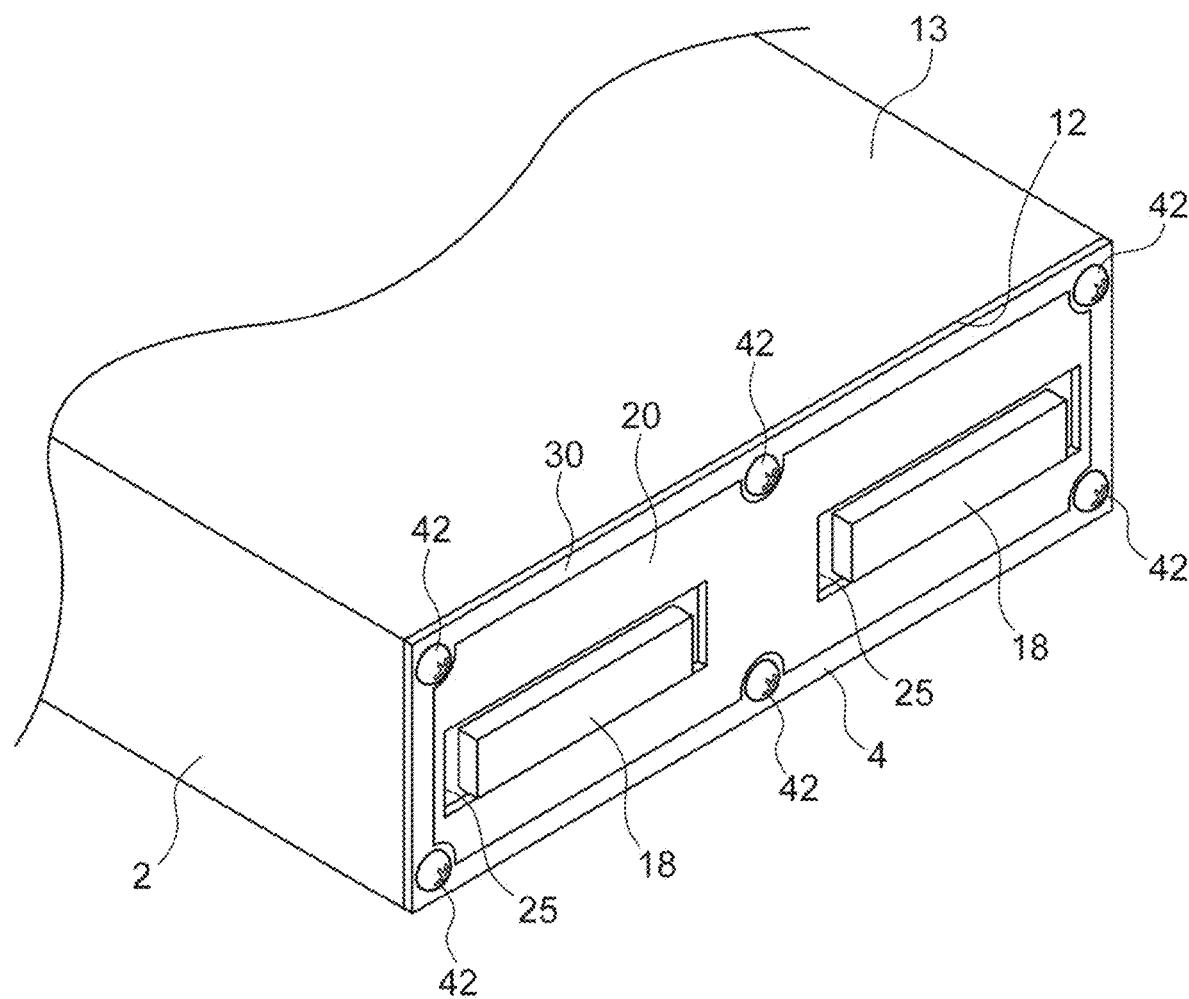
FIG. 2 is a perspective view in which the light source device illustrated in FIG. 1 is viewed from the back side.
Figure 3:
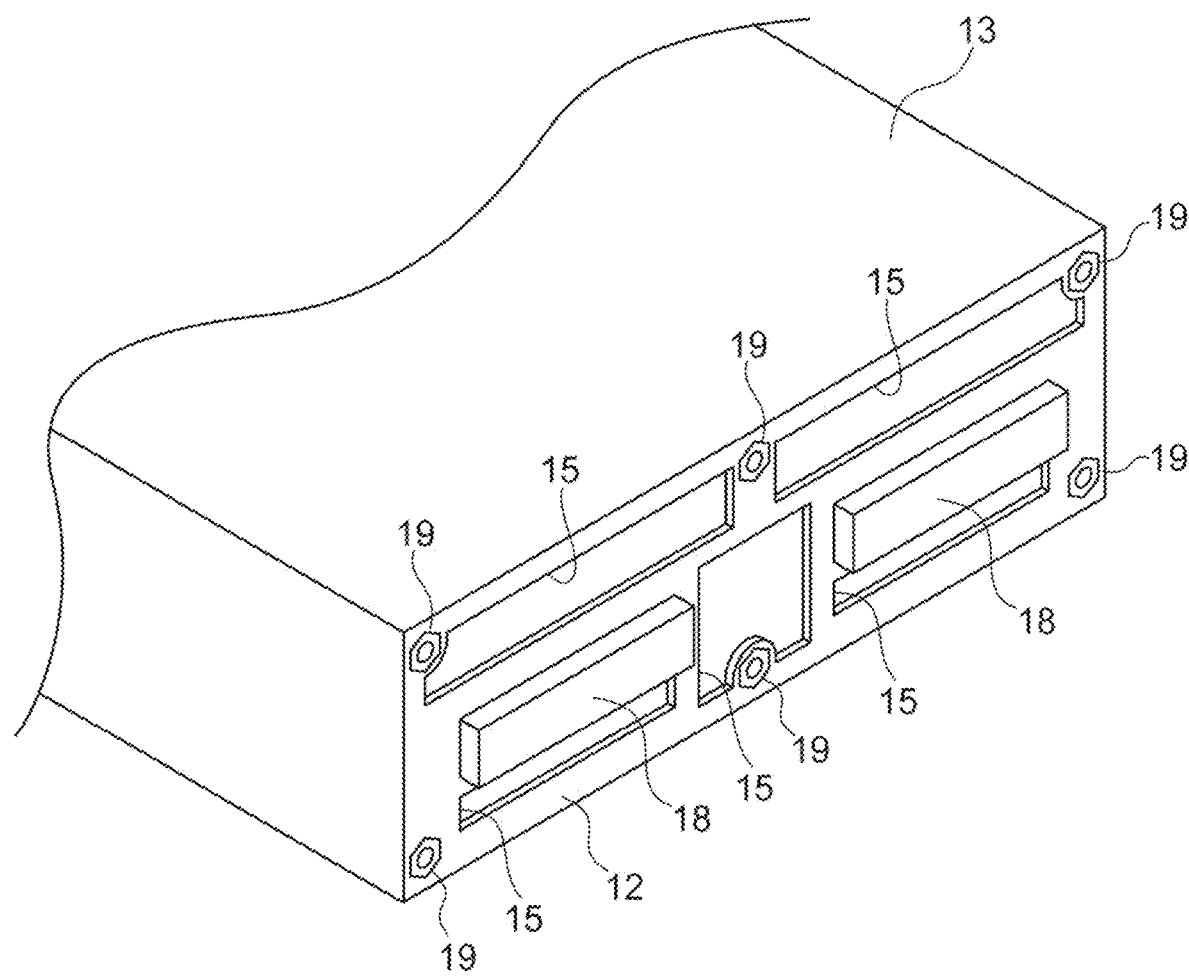
FIG. 3 is a diagram illustrating a state where the air filter is removed in FIG. 2.

A light source device 1 illustrated in FIGS. 1, 2, and 3 is, for example, a high-power air-cooled LED light source. The light source device 1 is used as, for example, a light source unit mounted on a UV printing device (UV printer). The light source device 1 performs ink drying and the like by emitting light such as ultraviolet light, for example. The light source device 1 includes a housing 2, an LED substrate 3, and an air filter 4.

The housing 2 is, for example, metallic and formed in a rectangular box shape and accommodates the LED substrate 3. The housing 2 may further accommodate a heat sink thermally connected to the LED substrate 3, an electric circuit board provided with a drive circuit of the light source device 1, a fan pumping air, and the like.

The housing 2 has a front surface 11, a back surface 12, and a side surface 13. The front surface 11 and the back surface 12 face each other in the direction orthogonal to the front surface 11. The side surface 13 extends along the direction orthogonal to the front surface 11 and is continuous with the front surface 11 and the back surface 12. The front surface 11 is provided with a transparent emission window 14. The back surface 12 is provided with a plurality of (five in this example) intake ports 15 for suctioning air into the housing 2 from the outside. Although each intake port 15 has, for example, a substantially rectangular cross-sectional shape, the number, shape, size, and disposition of the intake ports 15 may be set in any manner. The side surface 13 may be provided with a discharge port for discharging air to the outside from the inside of the housing 2. In the housing 2, air flows from the intake port 15 side toward the discharge port side.

The back surface 12 is further provided with a pair of terminal portions 18 and a plurality of (six in this example) screw receiving portions 19. Each terminal portion 18 is electrically connected to an internal circuit such as the electric circuit board. A cable for communication with the outside or the like is connected to each ter urinal portion 18. Each terminal portion 18 protrudes from the back surface 12 to the side opposite to the front surface 11. The plurality of screw receiving portions 19 are respectively disposed at positions corresponding to the positions of a plurality of through holes 41, which will be described later.

The LED substrate 3 has, for example, a substrate constituting a predetermined circuit and a plurality of LED elements (light sources) provided side by side on the substrate. The LED substrate 3 is disposed on the front surface 11 side in the housing 2. The light emitted from each LED element is emitted to an irradiation object through the emission window 14.

The air filter 4 is a filter for protecting the inside of the housing 2 from, for example, the dust and the mist that are contained in air suctioned into the housing 2. The air filter 4 is formed in a flat plate shape and is attached to the housing 2 so as to cover each intake port 15. In the present embodiment, the air filter 4 is formed in a rectangular plate shape corresponding to the shape of the back surface 12 and covers the entire back surface 12. For example, the length of the long side of the air filter 4 is approximately 100 mm and the length of the short side of the air filter 4 is approximately 40 mm.

Figure 4:
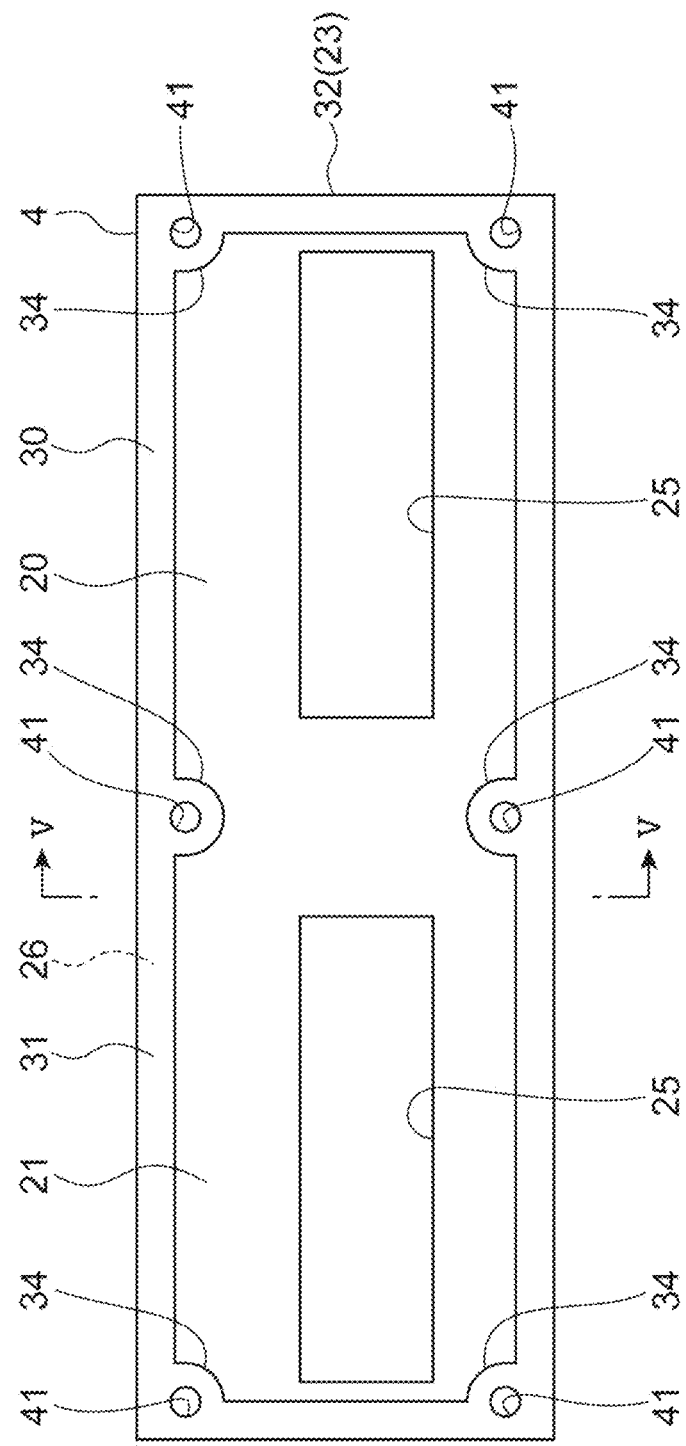
FIG. 4 is a front view of the air filter.
Figure 5:
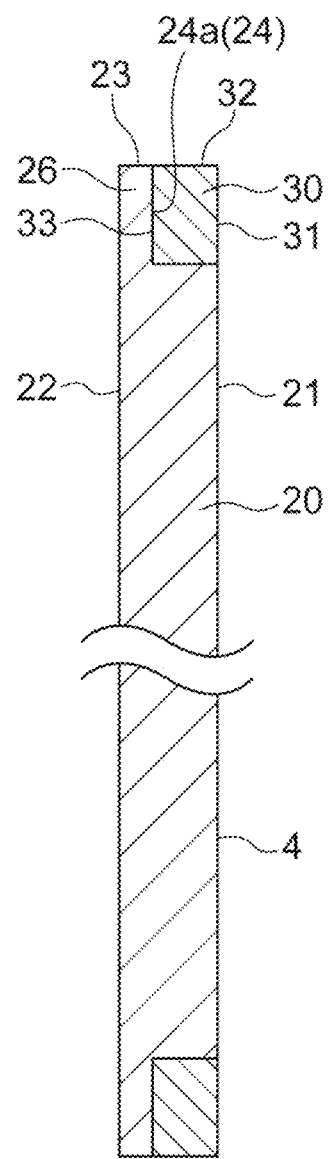
FIG. 5 is a cross-sectional view taken along line V-V illustrated in FIG. 4.

As illustrated in FIGS. 4 and 5, the air filter 4 includes a first urethane portion 20 and a second urethane portion 30. The air filter 4 is formed symmetrically with respect to a plane passing through the center of the air filter 4 and orthogonal to the long side of the air filter 4. The air filter 4 is formed symmetrically with respect to a plane passing through the center of the air filter 4 and orthogonal to the short side of the air filter 4. The air filter 4 may not necessarily be formed symmetrically with respect to the planes.

The first urethane portion 20 is formed in a substantially rectangular plate shape. The first urethane portion 20 has a first surface 21 and a second surface 22 facing each other and a side surface 23 continuous with the first surface 21 and the second surface 22. The first surface 21 is provided with a recess 24 having a shape corresponding to the second urethane portion 30. In the present embodiment, the recess 24 is a groove portion extending along the outer edge of the first urethane portion 20. The recess 24 has a substantially rectangular ring shape in a cross section along the first surface 21 and has a rectangular shape in a cross section orthogonal to the extending direction of the recess 24. The thickness of the first urethane portion 20 in the direction orthogonal to the first surface 21 (that is, the distance between the first surface 21 and the second surface 22) is, for example, approximately 1.5 mm.

The second urethane portion 30 is formed in a substantially rectangular frame shape. The second urethane portion 30 is disposed so as to overlap with a part 26 of the first urethane portion 20 in front view (that is, when viewed from the direction orthogonal to the first surface 21). The second urethane portion 30 is disposed in the recess 24 such that a surface 31 of the second urethane portion 30 is flush with the first surface 21 of the first urethane portion 20. In other words, the surface 31 is positioned on the same plane as the first surface 21. The second urethane portion 30 is disposed in the recess 24 without a gap. The second urethane portion 30 is disposed along the outer edge of the first urethane portion 20. A side surface 32, which is continuous with the surface 31 of the second urethane portion 30, is flush with the side surface 23 of the first urethane portion 20. The second urethane portion 30 has a substantially rectangular ring shape in a cross section along the first surface 21 (that is, a cross section parallel to the first surface 21) and has a rectangular shape in a cross section orthogonal to the extending direction of the second urethane portion 30. The thickness of the second urethane portion 30 in the direction orthogonal to the first surface 21 is, for example, approximately 10 mm. The second urethane portion 30 is coupled to the part 26 of the first urethane portion 20 at a bottom surface (that is, a surface opposite to the surface 31) 33. Details of this coupling will be described later. In the present embodiment, the part 26 of the first urethane portion 20 is a rectangular ring-shaped region extending along the outer edge of the first urethane portion 20 and is a region overlapping with a bottom surface 24a of the recess 24 in plan view.

The part of the first urethane portion 20 other than the part 26 (that is, the part not overlapping with the second urethane portion 30 in front view) is provided with a pair of openings 25 penetrating the first urethane portion 20 along the direction orthogonal to the first surface 21. Each opening 25 has a cross-sectional shape corresponding to the outer shape of the terminal portion 18 such that the terminal portion 18 can be inserted through the opening 25, which is disposed at a position corresponding to the position of the terminal portion 18. For example, each opening 25 has a rectangular shape that is larger than the terminal portion 18 in a cross section along the first surface 21. The pair of openings 25 are respectively disposed on one side and the other side in the direction along the long side of the first urethane portion 20 with respect to the center of the first urethane portion 20.

The first urethane portion 20 and the second urethane portion 30 are provided with the plurality of (six in this example) through holes 41 penetrating the first urethane portion 20 and the second urethane portion 30 along the direction orthogonal to the first surface 21. The plurality of through holes 41 are respectively disposed at positions corresponding to the positions of the plurality of screw receiving portions 19.

The second urethane portion 30 has a through hole forming portion 34, which protrudes toward the center of the first urethane portion 20, in each of four corner portions and the middle portions in two long side portions. The through hole forming portions 34 that are provided in the long side portions have a semicircular shape. The through hole forming portions 34 that are provided in the corner portions have a fan shape with a central angle of 90 degrees. The through hole 41 described above is formed in the through hole forming portion 34.

The air filter 4 is fixed to the back surface 12 of the housing 2 by a plurality of screws 42 being respectively inserted through the plurality of through holes 41 and screwed into the screw receiving portions 19. In other words, the air filter 4 is fixed to the housing 2 in the second urethane portion 30 by the fastening force of the screw 42.

Polyurethane foam having an open-cell structure constitutes the first urethane portion 20. Polyurethane foam may be foam made of polyurethane or urethane sponge, for example. The first urethane portion 20 is configured to include multiple interconnected cells (that is, open cells), has air permeability, and transmits air. In other words, the first urethane portion 20 includes open cells open to both the first surface 21 and the second surface 22. Polyurethane foam having an open-cell structure constitutes the second urethane portion 30.

The density of the second urethane portion 30 is higher than the density of the first urethane portion 20. For example, the density of the first urethane portion 20 is approximately 30 kg/m$^3$ and the density of the second urethane portion 30 is approximately 50 kg/m$^3$. Further, the number of cells per unit length of the second urethane portion 30 is larger than the number of cells per unit length of the first urethane portion 20. In other words, the size of the cell of the second urethane portion 30 is smaller than the size of the cell of the first urethane portion 20. For example, the number of cells per unit length of the first urethane portion 20 is 8/25 mm to 20/25 mm.

Although the second urethane portion 30 has an open-cell structure, the second urethane portion 30 is higher in density than the first urethane portion 20, and thus the second urethane portion 30 has no air permeability and hardly transmits air. The second urethane portion 30 may have a closed-cell structure. In this case, the second urethane portion 30 is configured to include multiple disconnected cells (that is, closed cells), has no air permeability, and blocks air. Although the second urethane portion 30 is, for example, semi-rigid foam, the second urethane portion 30 may also be rigid foam or flexible foam.

Figure 6A:
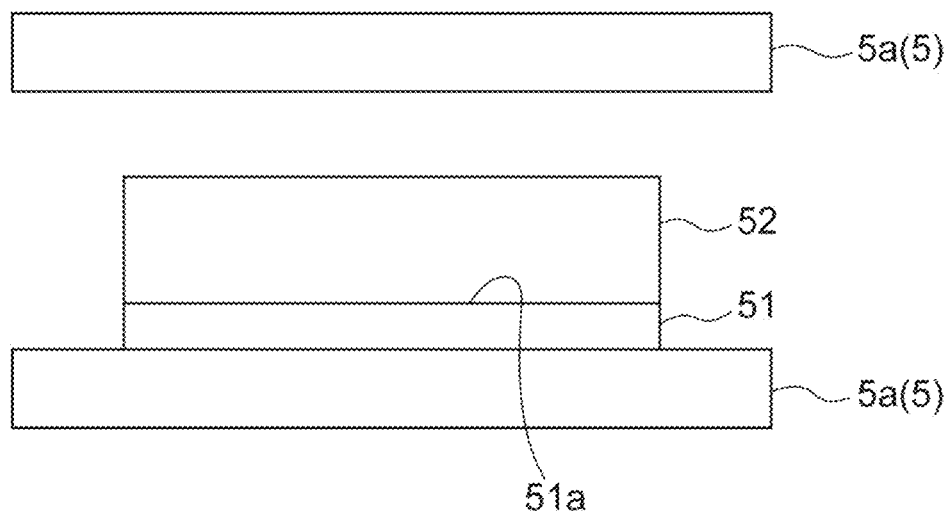
FIGS. 6A and 6B are diagrams illustrating an air filter manufacturing method.
Figure 6B:
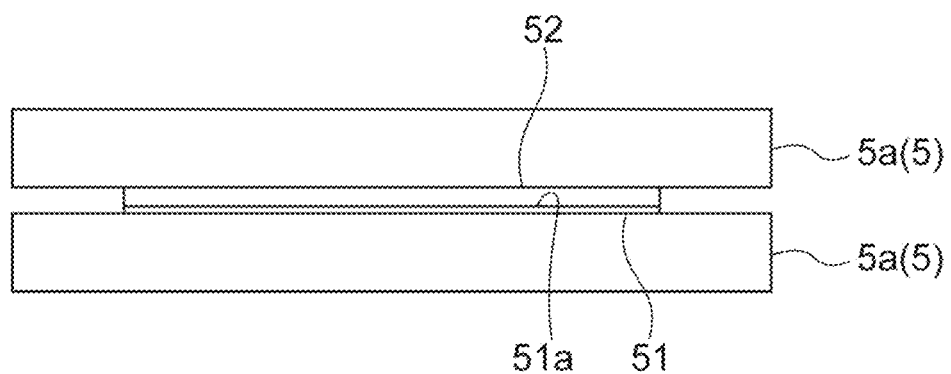

FIGS. 6A and 6B are diagrams illustrating a method for manufacturing the air filter 4. During the manufacturing of the air filter 4, a first urethane member 51 that becomes the first urethane portion 20 after processing and a second urethane member 52 that becomes the second urethane portion 30 after processing are overlapped with each other first (overlapping step), as illustrated in FIG. 6A, such that the second urethane member 52 overlaps with a part of the first urethane member 51 when viewed from the direction orthogonal to a surface 51a of the first urethane member 51 (that is, the direction of overlapping of the first urethane member 51 and the second urethane member 52). The part of the first urethane member 51 becomes the part 26 of the first urethane portion 20 after processing.

Subsequently, as illustrated in FIG. 6B, the first urethane member 51 and the second urethane member 52 are integrated with each other by thermocompression bonding (integration step). More specifically, the first urethane member 51 and the second urethane member 52 are sandwiched by a pair of heated press portions 5a by means of a press machine 5 having the pair of press portions 5a and are heat-pressed for a predetermined time. In the present embodiment, the heat pressing is performed in a state where the first urethane member 51 and the second urethane member 52 are directly overlapped with each other (that is, in a state where no other member is interposed between the first urethane member 51 and the second urethane member 52). The heat pressing is performed for 3 minutes at, for example, 180° C.

In the integration step, the first urethane member 51 and the second urethane member 52 are integrated with (coupled to) each other while being compressed by the heat pressing and are formed into a single flat plate-shaped member, that is, the air filter 4. At this time, the part of the first urethane member 51 that overlaps with the second urethane member 52 when viewed from the direction orthogonal to the surface 51a is compressed more than the other part. As a result, in the obtained air filter 4, the recess 24 is formed in the first urethane portion 20 and the second urethane portion 30 is disposed in the recess 24 without a gap as described above.

Before the thermocompression bonding, for example, the thickness of the first urethane member 51 is 3.5 mm and the thickness of the second urethane member 52 is 10 mm. After the thermocompression bonding, the total thickness of the first urethane member 51 and the second urethane member 52 (that is, the thickness of the air filter 4) is 1.5 mm. The planar shapes of the first urethane member 51 and the second urethane member 52 hardly change through the thermocompression bonding. Even before the thermocompression bonding, the density of the second urethane member 52 is higher than the density of the first urethane member 51 and the number of cells per unit length of the second urethane member 52 is larger than the number of cells per unit length of the first urethane member 51.

Figure 7:
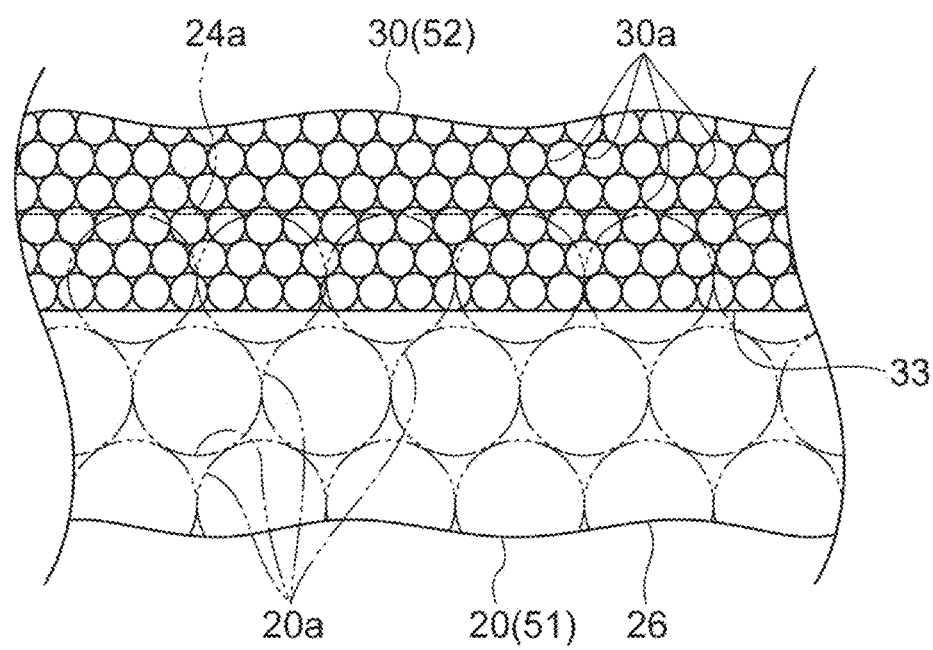
FIG. 7 is a schematic diagram illustrating a joint between a first urethane portion and a second urethane portion.

A joint part between the first urethane portion 20 (first urethane member 51) and the second urethane portion 30 (second urethane member 52) will be described with reference to FIG. 7. The first urethane portion 20 and the second urethane portion 30 are integrated with each other in a state where the second urethane portion 30 is incorporated in the part 26 of the first urethane portion 20.

The first urethane portion 20 has an open-cell structure as described above. The first urethane portion 20 includes multiple interconnected cells 20a. The first urethane portion 20 is lower in density than the second urethane portion 30. Accordingly, the first urethane portion 20 is sparser in structure than the second urethane portion 30. The second urethane portion 30 has an open-cell structure as described above. The second urethane portion 30 includes multiple interconnected cells 30a. The second urethane portion 30 is higher in density than the first urethane portion 20. Accordingly, the second urethane portion 30 is denser in structure than the first urethane portion 20.

Accordingly, once the heat pressing is performed in the integration step, the second urethane portion 30 (the fiber of the second urethane portion 30 to be specific) enters the cells 20a at the part 26 in the boundary portion between the part 26 of the first urethane portion 20 and the second urethane portion 30 (that is, the contact portion between the bottom surface 24a of the recess 24 in the first urethane portion 20 and the bottom surface 33 of the second urethane portion 30). As a result, the first urethane portion 20 and the second urethane portion 30 are integrated with each other. The part 26 of the first urethane portion 20 and the second urethane portion 30 may be intertwined with each other. Although the cells 20a are not interconnected in FIG. 7, the cells 20a are interconnected in practice. The same applies to the cells 30a. Although the cells 20a and 30a are regularly arranged in FIG. 7, the cells 20a and 30a are irregularly arranged in practice.

Returning to the method for manufacturing the air filter 4, the plurality of through holes 41 penetrating the first urethane member 51 and the second urethane member 52 are formed subsequently to the integration step. Subsequently, the pair of openings 25 penetrating the first urethane member 51 are formed at the part other than the part of the first urethane member 51 overlapping with the second urethane member 52. The air filter 4 is obtained as a result of the above steps. Each of the above steps may be carried out by, for example, a worker and/or a work machine.

As described above, in the air filter 4, the air-permeable first urethane portion 20 made of polyurethane foam and the second urethane portion 30 made of polyurethane foam are integrated with each other in a state where the second urethane portion 30 is incorporated (inserted) in the part 26 of the first urethane portion 20. As a result, it is possible to omit a frame member for holding a filter member as described above or a frame member sandwiching and fixing an air filter between a housing and the frame member and it is possible to reduce the thickness of the air filter 4. In addition, because the density of the second urethane portion 30 is higher than the density of the first urethane portion 20, rigidity can be ensured for the air filter 4 even after the air filter 4 is reduced in thickness and handling of the air filter 4 can be facilitated. Further, the air filter 4 can be easily fixed to an attachment target (such as the housing 2) in the high-density second urethane portion 30 even after the air filter 4 is reduced in thickness. Accordingly, the air filter 4 can be reduced in thickness with attachability ensured.

In the air filter 4, the first surface 21 of the first urethane portion 20 is provided with the recess 24 and the second urethane portion 30 is disposed in the recess 24 such that the surface 31 of the second urethane portion 30 is flush with the first surface 21 of the first urethane portion 20. As a result, the thickness of the air filter 4 can be further reduced.

In the air filter 4, the second urethane portion 30 is formed in a frame shape and is disposed along the outer edge of the first urethane portion 20. As a result, the attachability of the air filter 4 can be ensured in a more reliable manner.

The air filter 4 is provided with the through hole 41 penetrating the first urethane portion 20 and the second urethane portion 30. As a result, it is possible to attach the air filter 4 to the housing 2 by, for example, inserting the screw 42 into the through hole 41 and it is possible to ensure the attachability of the air filter 4 in an even more reliable manner.

In the air filter 4, the remaining part of the first urethane portion 20 other than the part 26 is provided with the opening 25 penetrating the first urethane portion 20. As a result, it is possible to attach the air filter 4 to the housing 2 such that, for example, the terminal portion 18 is disposed in the opening 25 and it is possible to ensure the attachability of the air filter 4 in an even more reliable manner.

In the light source device 1, the air filter 4 is disposed so as to cover the intake port 15 and is fixed to the housing 2 in the second urethane portion 30. The light source device 1 is provided with the air filter 4, which can be reduced in thickness with attachability ensured as described above, and thus the light source device 1 can be reduced in size.

In the method for manufacturing the air filter 4, the air-permeable first urethane member 51 made of polyurethane foam and the second urethane member 52 made of polyurethane foam are overlapped with each other and integrated with each other by thermocompression bonding. As a result, it is possible to omit the frame member and it is possible to obtain the thickness-reduced air filter 4. In the obtained air filter 4, the part that the second urethane member 52 constitutes (that is, the second urethane portion 30) is higher in density than the part that the first urethane member 51 constitutes (that is, the first urethane portion 20). Accordingly, rigidity can be ensured for the air filter 4 even after the air filter 4 is reduced in thickness and handling of the air filter 4 can be facilitated. Further, even in a case where the air filter 4 is reduced in thickness, it is possible to easily fix the air filter 4 to the housing 2 at the part that the second urethane member 52 constitutes. As described above, the air filter 4 that can be reduced in thickness with attachability ensured can be obtained by the method for manufacturing the air filter 4.

Figure 8A:
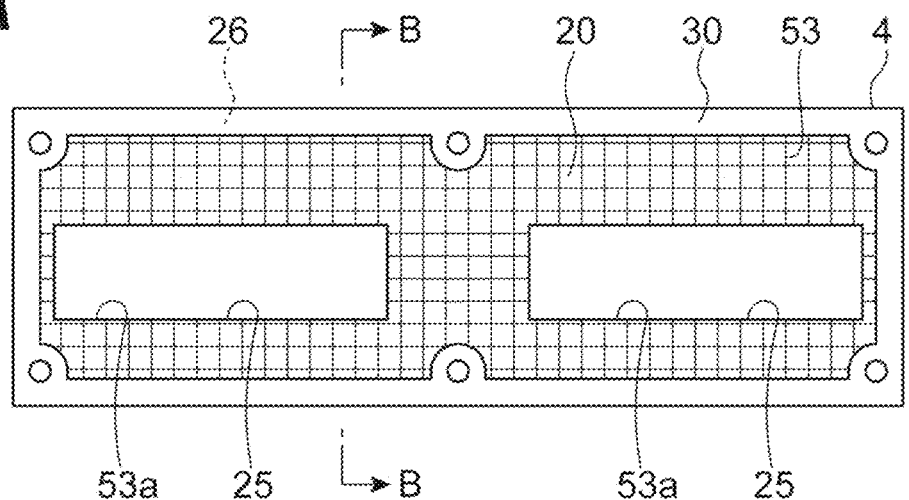
FIG. 8A is a front view of an air filter according to a first modification example.
Figure 8B:
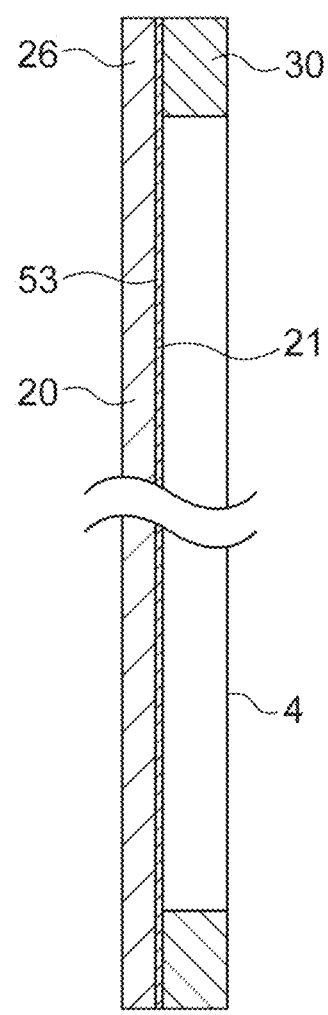
FIG. 8B is a cross-sectional view taken along line B-B illustrated in FIG. 8A.

The present disclosure is not limited to the embodiment of the present disclosure described above. For example, the air filter 4 may be further include a metallic mesh member 53 disposed between the first urethane portion 20 and the second urethane portion 30 as in a first modification example illustrated in FIGS. 8A and 8B. The mesh member 53 has, for example, a rectangular outer shape corresponding to the outer shape of the first urethane portion 20. In the first modification example, the recess 24 is not formed in the first surface 21 of the first urethane portion 20 and the first surface 21 is a flat surface. During manufacturing of the air filter 4 of the first modification example, the first urethane member 51 and the second urethane member 52 are integrated with each other by thermocompression bonding in the integration step with the mesh member 53 disposed between the first urethane member 51 and the second urethane member 52. In the air filter 4 of the first modification example, the first urethane portion 20 and the second urethane portion 30 are integrated with each other in a state where the second urethane portion 30 has entered the part 26 of the first urethane portion 20 through the mesh member 53.

In the first modification example, the mesh member 53 has a mesh spacing of 2 mm or more such that the second urethane portion 30 is capable of easily entering the gap formed between the meshes of the mesh member 53. This is based on the knowledge that the first urethane portion 20 and the second urethane portion 30 are satisfactorily coupled to each other in a case where the mesh member 53 has a mesh diameter of 0.5 mm and a mesh spacing of 2.5 mm whereas the first urethane portion 20 and the second urethane portion 30 easily peel without being satisfactorily coupled to each other in a case where the mesh member 53 has a mesh diameter of 0.2 mm and a mesh spacing of 1 mm. Also with the air filter 4 of the first modification example, thickness reduction can be achieved and attachability can be ensured as in the above embodiment. Further, the air filter 4 of the first modification example is further include the metallic mesh member 53 disposed between the first urethane portion 20 and the second urethane portion 30. Accordingly, the rigidity of the air filter 4 can be enhanced and the attachability of the air filter 4 can be ensured in an even more reliable manner.

Figure 9:
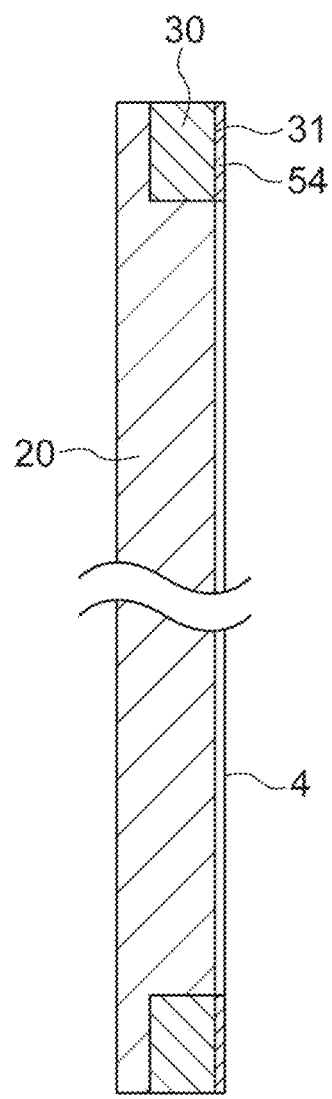
FIG. 9 is a cross-sectional view of an air filter according to a second modification example.

The surface 31 of the second urethane portion 30 may be provided with an adhesive layer 54 as in a second modification example illustrated in FIG. 9. The adhesive layer 54 is, for an example, a double-sided tape or the like and is provided over the entire surface 31. Also with the air filter 4 of the second modification example, thickness reduction can be achieved and attachability can be ensured as in the above embodiment. Further, the air filter 4 can be attached to the housing 2 by the adhesive layer 54, and thus the attachability of the air filter 4 can be ensured in an even more reliable manner. The through hole 41 may not be provided in the second modification example. In this case, the air filter 4 may be attached to the housing 2 only by the adhesive layer 54 without the screw 42 being used. In a case where the screw 42 and the adhesive layer 54 are used in combination, the adhesion between the air filter 4 and the housing 2 can be improved and the air filter 4 can be more firmly fixed to the housing 2. The adhesive layer 54 may be provided on the surface 31 of the second urethane portion 30 in the first modification example described above.

Figure 10A:
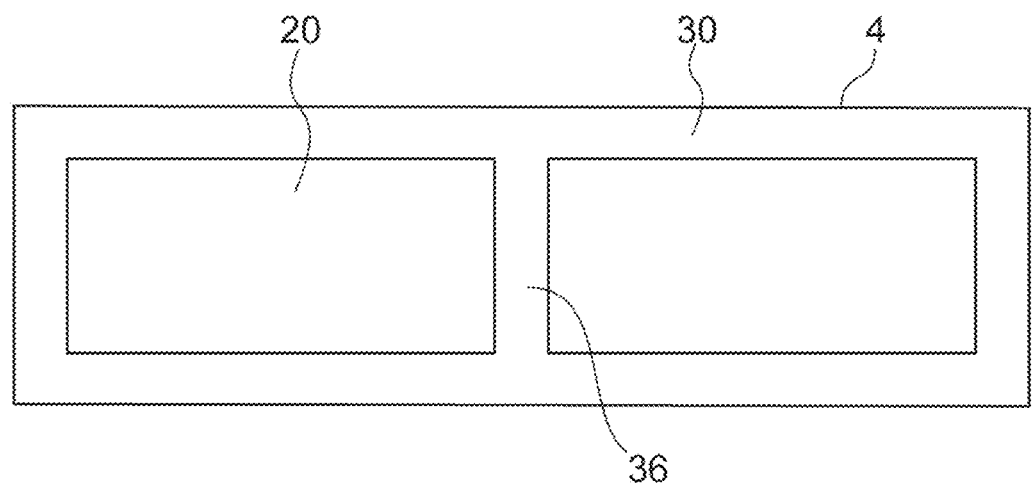
FIG. 10A is a front view of an air filter according to a third modification example.
Figure 10B:
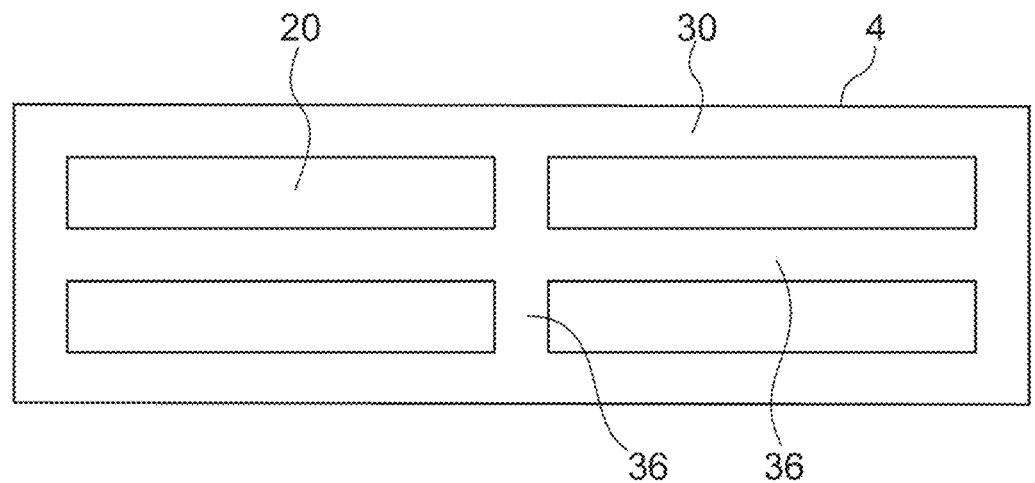
FIG. 10B is a front view of an air filter according to a fourth modification example.

The second urethane portion 30 may have a linear connecting portion 36 interconnecting the pair of long side portions as in a third modification example illustrated in FIG. 10A. As in a fourth modification example illustrated in FIG. 10B, the second urethane portion 30 may further have the linear connecting portion 36 interconnecting a pair of short side portions in the third modification example. Also with the air filter 4 of the third and fourth modification examples, thickness reduction can be achieved and attachability can be ensured as in the above embodiment. Further, in the third and fourth modification examples, the rigidity of the second urethane portion 30 can be effectively enhanced because the connecting portion 36 is provided. The shape of the second urethane portion 30 in the third and fourth modification examples is particularly effective in a case where the planar shape of the air filter 4 is large.

Figure 11A:
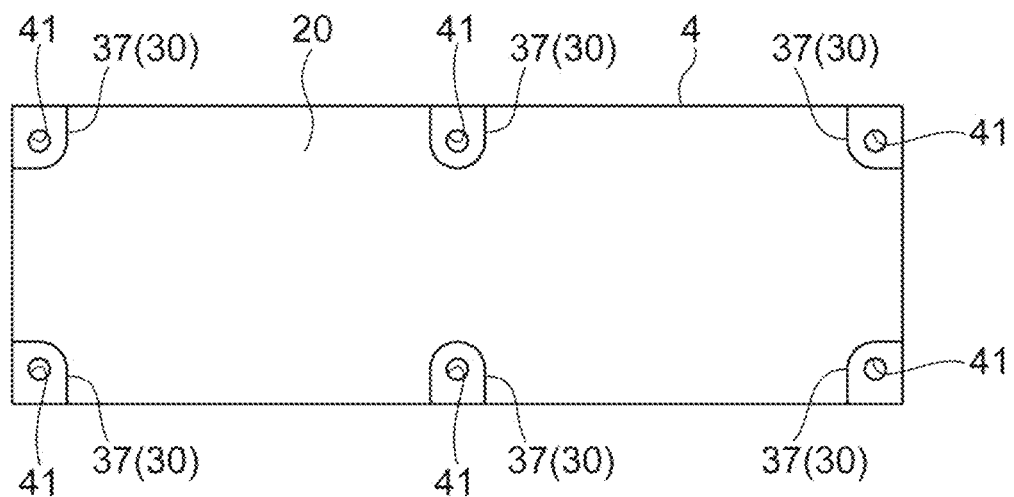
FIG. 11A is a front view of an air filter according to a fifth modification example.
Figure 11B:
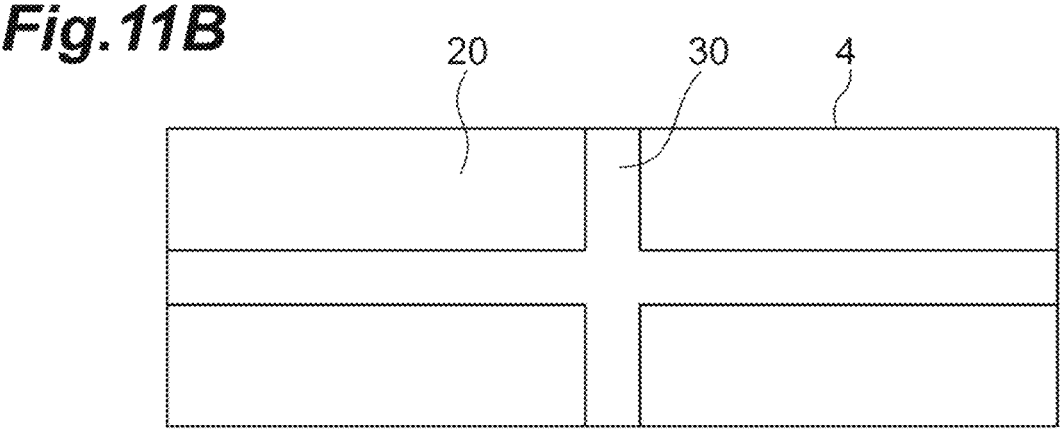
FIG. 11B is a front view of an air filter according to a sixth modification example.
Figure 11C:
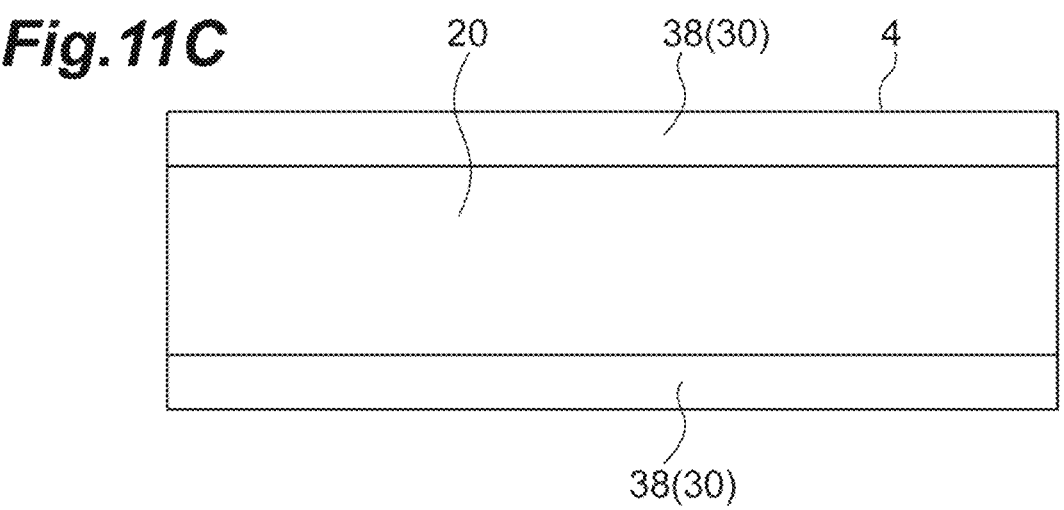
FIG. 11C is a front view of an air filter according to a seventh modification example.

The second urethane portion 30 may be constituted by four parts 37 overlapping with the four corner portions of the first urethane portion 20 in front view as in a fifth modification example illustrated in FIG. 11A. The through hole 41 may be formed at each part 37. The second urethane portion 30 may have a cross shape in front view as in a sixth modification example illustrated in FIG. 11B. The second urethane portion 30 may be constituted by a pair of linear portions 38 overlapping with a pair of facing side portions of the first urethane portion 20 in front view as in a seventh modification example illustrated in FIG. 11C. Also with the air filter 4 of the fifth to seventh modification examples, thickness reduction can be achieved and attachability can be ensured as in the above embodiment. In the embodiment and each modification example, various materials and shapes can be adopted, without being limited to the above-described material and shape, for the material and shape of each configuration. The air filter 4 may be applied to devices other than the light source device 1. For example, the air filter 4 may be applied to a device in which a housing incorporates a heat generation unit (such as a light source, a light receiving portion, and a drive circuit) that generates heat in operation, air needs to flow into the housing, and dust intrusion into the housing needs to be prevented. For example, the air filter 4 may be applied to radiation source devices such as X-ray devices, electron beam source devices, various light receiving devices, radiation detection devices, radiation imaging devices, projection devices (projectors), personal computers, and the like.

What is claimed is:

1. An air filter comprising:
a first urethane portion made of polyurethane foam and having air permeability; and
a second urethane portion made of polyurethane foam and disposed so as to overlap with a part of the first urethane portion, wherein
the second urethane portion is higher in density than the first urethane portion, and
the first urethane portion and the second urethane portion are integrated with each other in a state where the second urethane portion is incorporated in the part of the first urethane portion.

2. The air filter according to claim 1, wherein
a recess is provided in a surface of the first urethane portion, and
the second urethane portion is disposed in the recess such that a surface of the second urethane portion is flush with the surface of the first urethane portion.

3. The air filter according to claim 1, further comprising a metallic mesh member disposed between the first urethane portion and the second urethane portion.

4. The air filter according to claim 1, wherein the second urethane portion is formed in a frame shape and disposed along an outer edge of the first urethane portion.

5. The air filter according to claim 1, wherein a through hole is provided so as to penetrate the first urethane portion and the second urethane portion.

6. The air filter according to claim 1, wherein an adhesive layer is provided on a surface of the second urethane portion.

7. The air filter according to claim 1, wherein an opening penetrating the first urethane portion is provided at a remaining part of the first urethane portion other than the part.

8. A light source device comprising:
the air filter according to claim 1; and
a housing provided with an intake port and accommodating a light source,
wherein the air filter is disposed so as to cover the intake port and fixed to the housing in the second urethane portion.

9. An air filter manufacturing method comprising:
an overlapping step of overlapping a first urethane member made of polyurethane foam and having air permeability and a second urethane member made of polyurethane foam and higher in density than the first urethane member with each other such that the second urethane member overlaps a part of the first urethane member; and
an integration step of integrating the first urethane member and the second urethane member with each other by thermocompression bonding after the overlapping step, in a state where the second urethane portion is incorporated in the part of the first urethane portion.

10. The air filter manufacturing method according to claim 9, wherein in the integration step, the first urethane member and the second urethane member are integrated with each other by thermocompression bonding in a state where the first urethane member and the second urethane member are directly overlapped with each other.

11. The air filter manufacturing method according to claim 9, wherein
in the overlapping step, the first urethane member, the second urethane member, and a metallic mesh member are mutually overlapped such that the mesh member is disposed between the first urethane member and the second urethane member, and
in the integration step, the first urethane member and the second urethane member are integrated with each other by thermocompression bonding in a state where the mesh member is disposed between the first urethane member and the second urethane member.

12. The air filter manufacturing method according to claim 9, further comprising a step of forming a through hole after the integration step, the through hole penetrating the first urethane member and the second urethane member.

13. The air filter manufacturing method according to claim 9 further comprising a step of forming an adhesive layer on a surface of the second urethane member after the integration step.

14. The air filter manufacturing method according claim 9, further comprising a step of forming an opening at a remaining part of the first urethane member other than the part after the integration step, the opening penetrating the first urethane member.

* * * * *